(12) United States Patent
Wang (10) Patent No.: US 11,776,258 B1
(45) Date of Patent: Oct. 3, 2023

(54) HEAD-MOUNTED DEVICE WITH FEEDBACK

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/945,969

(22) Filed: Sep. 15, 2022

Related U.S. Application Data (63) Continuation of application No. 16/830,091, filed on Mar. 25, 2020, now abandoned.

(60) Provisional application No. 62/840,661, filed on Apr. 30, 2019.

(51) Int. Cl.
*G06V 20/20* (2022.01)
*G06F 3/16* (2006.01)
*G10L 15/22* (2006.01)

(52) U.S. Cl.
CPC .............. *G06V 20/20* (2022.01); *G06F 3/165* (2013.01); *G06F 3/167* (2013.01); *G10L 15/22* (2013.01); *G06V 2201/07* (2022.01); *G10L 2015/223* (2013.01)

(58) Field of Classification Search
CPC ......... G06V 20/20; G06F 3/165; G06F 3/167; G10L 15/22

USPC ......................................................... 345/633
See application file for complete search history.

(56) References Cited

U.S. PATENT DOCUMENTS

| | | | |
|---|---|---|---|
| 10,594,757 B1 | 3/2020 | Shevchenko | |
| 2009/0112616 A1 | 4/2009 | Jung | |
| 2017/0105053 A1 | 4/2017 | Todd | |
| 2017/0365101 A1* | 12/2017 | Samec | A61B 5/4082 |
| 2017/0372627 A1 | 12/2017 | Zhu | |
| 2018/0070143 A1 | 3/2018 | Joffe | |
| 2018/0360371 A1 | 12/2018 | Hamilton et al. | |
| 2019/0008441 A1* | 1/2019 | Guzik | A61B 5/163 |
| 2019/0259291 A1 | 8/2019 | Pradhan | |
| 2022/0021985 A1* | 1/2022 | Wexler | G10L 25/51 |

FOREIGN PATENT DOCUMENTS

| | | |
|---|---|---|
| CN | 106580263 A | 4/2017 |
| KR | 101934019 B1 | 12/2018 |

* cited by examiner

*Primary Examiner* — Thomas J Lett
(74) *Attorney, Agent, or Firm* — BAKERHOSTETLER (57) ABSTRACT

A head-mounted device can be operated to detect and respond to a user's behavior. The head-mounted device can be regularly and frequently worn while the user performs regular daily tasks, allowing the head-mounted device to collect a large volume of data across a long duration of time. The head-mounted device can provide feedback that can guide and direct a user to correct actions.

20 Claims, 4 Drawing Sheets

HEAD-MOUNTED DEVICE WITH FEEDBACK

CROSS-REFERENCE TO RELATED APPLICATIONS

This application is a continuation of U.S. application Ser. No. 16/830,091, entitled "HEAD-MOUNTED DEVICE WITH FEEDBACK," filed Mar. 25, 2020, which claims the benefit of U.S. Provisional Application No. 62/840,661, entitled "HEAD-MOUNTED DEVICE WITH FEEDBACK," filed Apr. 30, 2019, the entirety of which is incorporated herein by reference.

TECHNICAL FIELD

The present description relates generally to head-mounted devices, and, more particularly, to head-mounted devices that can detect and respond to a user's behavior.

BACKGROUND

A head-mounted device can be worn by a user to display visual information within the field of view of the user. A user may observe outputs provided by the head-mounted device, such as visual information provided on a display. The display can optionally allow a user to observe an environment outside of the head-mounted device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In general, a head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device.

A head-mounted device can be regularly and frequently worn while the user performs regular daily tasks. Because a head-mounted device can be mobile and allow a user to see an external environment, the use of the head-mounted device allows the user to maintain a high quality of life. Accordingly, the user may be more likely to use it regularly and often, thereby providing the head-mounted device with ample opportunities to collect data. As the head-mounted device is regularly or frequently used, the head-mounted device can monitor activities of a user wearing the head-mounted device.

The head-mounted device includes hardware (e.g., display, camera, microphone, eye-tracking device, etc.) that allow meaningful feedback to a user. The head-mounted device can determine whether a user is speaking the wrong words to refer to subjects identified by the head-mounted device. The head-mounted device can determine whether the user is failing to interact with objects for which the user is reaching. The head-mounted device can determine whether the user is putting items where they do not belong.

Additionally, evaluations facilitated by such a head-mounted device can be based on data that is collected directly, rather than a user's own recollection and anecdotes.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
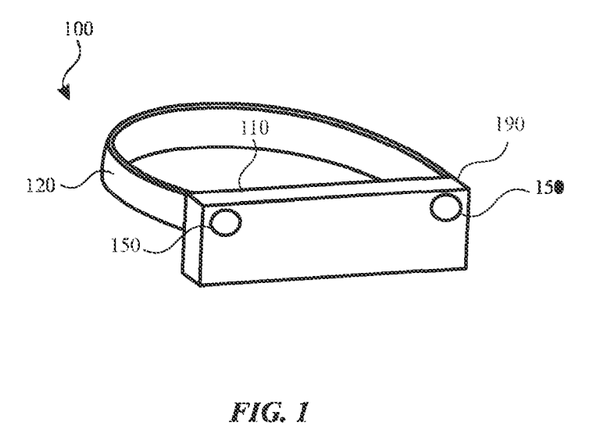
FIG. 1 illustrates a perspective view of a head-mounted device, according to some embodiments of the present disclosure.

According to some embodiments, for example as shown in FIG. 1, a head-mounted device 100 includes a frame 190 that is worn on a head of a user. The frame 190 can be positioned in front of the eyes of a user to provide information within a field of view of the user. The frame 190 can provide nose pads or another feature to rest on a user's nose. The frame 190 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mounted device 100 to a user's head. For example, one or more bands, straps, belts, caps, hats, or other components can be used in addition to or in place of the illustrated components of the head-mounted device 100. By further example, the securement element 120 can include multiple components to engage a user's head.

The frame 190 can provide structure around a peripheral region thereof to support any internal components of the frame 190 in their assembled position. For example, the frame 190 can enclose and support various internal components (including for example integrated circuit chips, processors, memory devices and other circuitry) to provide computing and functional operations for the head-mounted device 100, as discussed further herein. Any number of components can be included within and/or on the frame 190 and/or the securement element 120 and be operably connected to each other.

The frame 190 can include and/or support one or more cameras 150. The cameras 150 can be positioned on or near an outer side of the frame 190 to capture images of views external to the head-mounted device 100. The captured images can be used for display to the user or stored for any other purpose. Additionally or alternatively, other sensors, input devices, and/or output devices can be positioned at or on an exterior side of the frame 190.

A display 110 can optionally transmit light from a physical environment for viewing by the user. Such a display 110 can include optical properties, such lenses for vision correction based on incoming light from the physical environment. Additionally or alternatively, a display 110 can provide information as a display within a field of view of the user. Such information can be provided to the exclusion of a view of a physical environment or in addition to (e.g., overlaid with) a physical environment. Additionally or alternatively, other sensors, input devices, and/or output devices can be positioned at or on an interior side of the frame 190.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
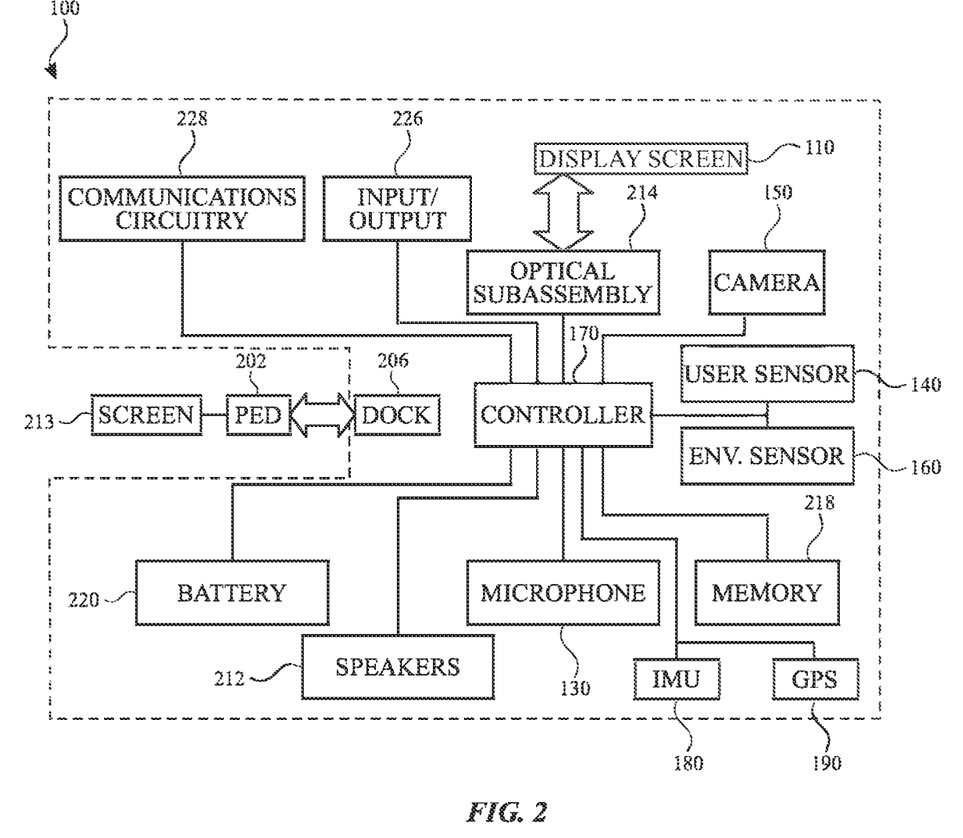
FIG. 2 illustrates a block diagram of a head-mounted device, in accordance with some embodiments of the present disclosure.

Referring now to FIG. 2, components of the head-mounted device can be operably connected to provide the performance described herein. FIG. 2 shows a simplified block diagram of a head-mounted device 100 in accordance with one or more embodiments of the disclosure. It will be appreciated that components described herein can be provided on either or both of a frame and/or a securement element of the head-mounted device 100.

As shown in FIG. 2, the head-mounted device 100 can include a processor 170 with one or more processing units that include or are configured to access a memory 218 having instructions stored thereon. The instructions or computer programs may be configured to perform one or more of the operations or functions described with respect to the head-mounted device 100. The processor 170 can be implemented as any electronic device capable of processing, receiving, or transmitting data or instructions. For example, the processor 170 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mounted device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mounted device 100 can further include a display 110 for displaying visual information for a user. The display 110 can provide visual (e.g., image or video) output. The display 110 can be or include an opaque, transparent, and/or translucent display. The display 110 may have a transparent or translucent medium through which light representative of images is directed to a user's eyes. The display 110 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mounted device 100 can include an optical subassembly 214 configured to help optically adjust and correctly project the image based content being displayed by the display 110 for close up viewing. The optical subassembly 214 can include one or more lenses, mirrors, or other optical devices.

The head-mounted device 100 can include the camera 150 for capturing a view of an environment external to the head-mounted device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or object located within a field of view of the camera 150. The image may be stored in a digital file in accordance with any one of a number of digital formats. In some embodiments, the head-mounted device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mounted device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

Additionally or alternatively, the head-mounted device 100 can include one or more environment sensors 160 that are directed to an external environment. Such environment sensors 160 can include any sensor that detects one or more conditions in an environment of the head-mounted device 100. For example, an environment sensor 160 can include an imaging device, a thermal sensor, a proximity sensor, a motion sensor, a humidity sensor, a chemical sensor, a light sensor, and/or a UV sensor. An environment sensor 160 can be configured to sense substantially any type of characteristic such as, but not limited to, images, pressure, light, touch, force, temperature, position, motion, and so on. For example, the environment sensor 160 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The head-mounted device 100 can include a host inertial measurement unit ("IMU") 180 that provides information regarding a characteristic of the head-mounted device 100, such as inertial angles thereof. For example, the host IMU 180 can include a six-degrees of freedom IMU that calculates the host device's position, velocity, and/or acceleration based on six degrees of freedom (x, y, z, $\theta_x$, $\theta_y$, and $\theta_z$). The host IMU 180 can include one or more of an accelerometer, a gyroscope, and/or a magnetometer. Additionally or alternatively, the head-mounted device 100 can detect motion characteristics of the head-mounted device 100 with one or more other motion sensors, such as an accelerometer, a gyroscope, a global positioning sensor, a tilt sensor, and so on for detecting movement and acceleration of the head-mounted device 100. The host IMU 180 can provide data to the processor 170 for processing.

The head-mounted device 100 can include one or more user sensors 140 for tracking features of the user wearing the head-mounted device 100. For example, a user sensor 140 can perform facial feature detection, facial movement detection, facial recognition, eye-tracking, user mood detection, user emotion detection, voice detection, etc. Such eye-tracking may be used to determine a location of information to be displayed on the display 110 and/or a portion (e.g., object) of a view to be analyzed by the head-mounted device 100. By further example, the user sensor 140 can be a bio-sensor for tracking biometric characteristics, such as health and activity metrics. The user sensor 140 can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The user sensor 140 can include one or more electroencephalograph (EEG) electrodes configured to attach to the head of the user and detect brain activity. The EEG electrodes can allow the acquisition of EEG signals. The electrode arrangement can be provided according to the International 10-20 System. For example, electrodes can be provided for placement at the forehead and scalp of the user. The signals can be recorded and analyzed to assess the activity of the brain in relation to other detected activities, such as speech, gestures, and/or eye gaze direction of the user.

The head-mounted device 100 can include a battery 220, which can charge and/or power components of the head-mounted device 100. The battery 220 can also charge and/or power components connected to the head-mounted device 100, such as a portable electronic device 202, as discussed further herein.

The head-mounted device 100 can include an input/output component 226, which can include any suitable component for connecting head-mounted device 100 to other devices. Suitable components can include, for example, audio/video jacks, data connectors, or any additional or alternative input/output components.

The head-mounted device 100 can include communications circuitry 228 for communicating with one or more servers or other devices using any suitable communications protocol. For example, communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 228 can also include an antenna for transmitting and receiving electromagnetic signals.

The head-mounted device 100 can include the microphone 230 as described herein. The microphone 230 can be operably connected to the processor 170 for detection of sound levels and communication of detections for further processing, as described further herein.

The head-mounted device 100 can include the speakers 222 as described herein. The speakers 222 can be operably connected to the processor 170 for control of speaker output, including sound levels, as described further herein.

The head-mounted device 100 can optionally connect to a portable electronic device 202, which can provide certain functions. For the sake of brevity, the portable electronic device 202 will not be described in detail in FIG. 2. It should be appreciated, however, that the portable electronic device 202 may be embodied in a variety of forms including a variety of features, all or some of which can be utilized by the head-mounted device 100 (e.g., input/output, controls, processing, battery, etc.). The portable electronic device 202 can provide a handheld form factor (e.g., small portable electronic device which is light weight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mounted device 100.

The head-mounted device 100 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mounted device 100. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mounted device 100.

Figure 3:
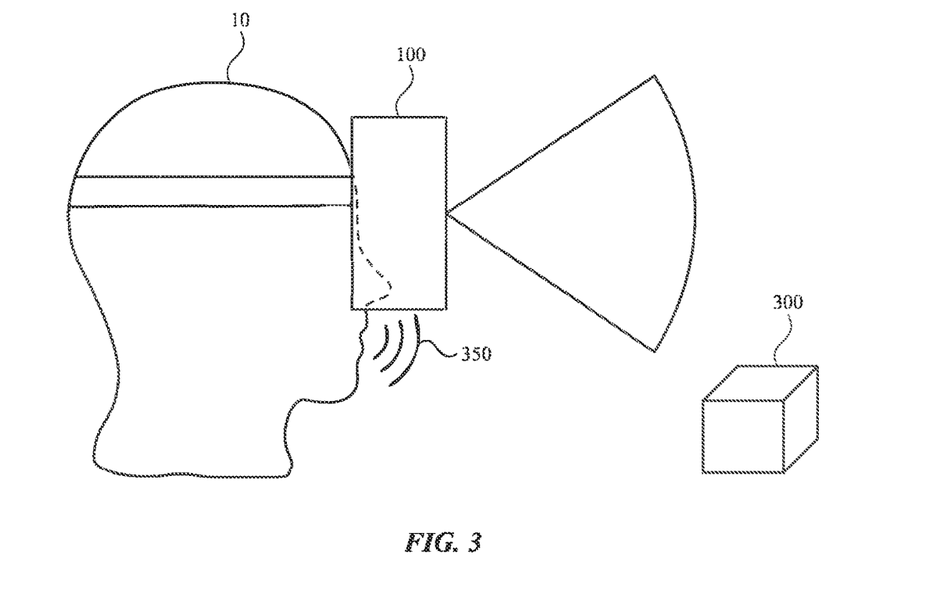
FIG. 3 illustrates a schematic view of a head-mounted device for detecting an object and user input, according to some embodiments of the present disclosure.
Figure 4:
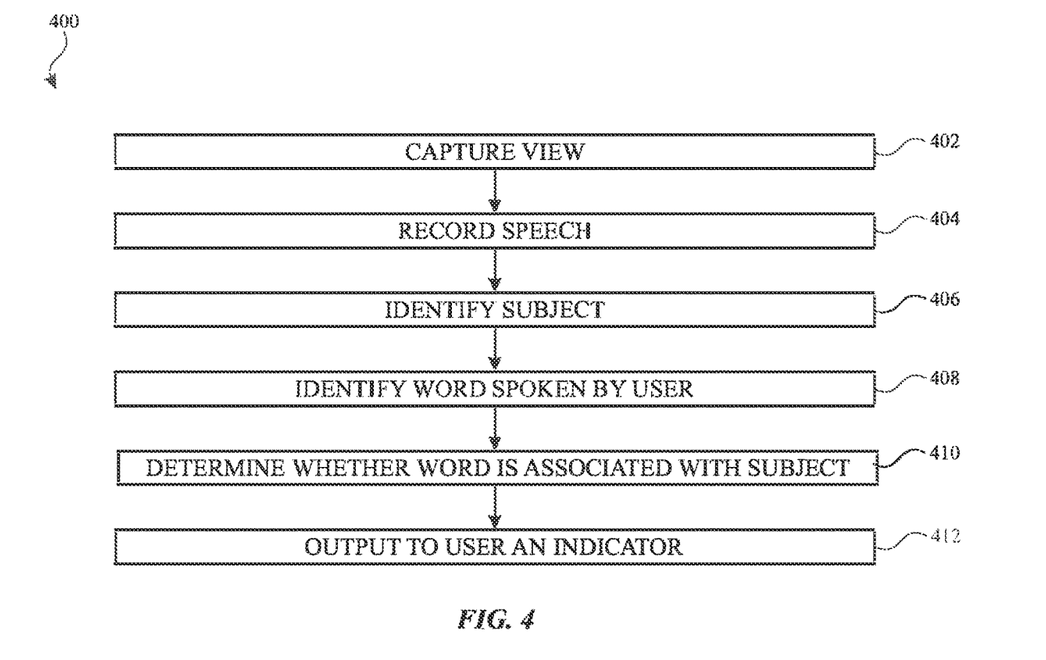
FIG. 4 illustrates a method of operating a head-mounted device, in accordance with some embodiments of the present disclosure.

Referring now to FIGS. 3 and 4, a head-mounted device can detect and/or respond to language disturbance. In particular, the head-mounted device can be configured to detect repetitions of words and or substitution of words with incorrect words. Appropriate responses can be provided by the head-mounted device upon detection.

As shown in FIG. 3, a head-mounted device 100 can be configured to record speech 350 from a user 10 wearing the head-mounted device 100. The recording can be performed by a microphone of the head-mounted device 100 and/or another microphone in communication with the head-mounted device 100. The head-mounted device can analyze the speech 350 for user identification and/or content recognition. For example, the head-mounted device 100 can determine that the user 10 is the source of the speech 350. The speech 350 can be analyzed to detect for certain conditions, such as repetition of a word, proper or improper syntax, proper or improper grammar, speed of speech, duration of a delay between spoken words, and the like.

The recorded speech can be analyzed based on a comparison with environmental elements detected by the head-mounted device. For example, the head-mounted device 100 can be configured to capture a view of an object 300 in an environment external to the head-mounted device 100. The head-mounted device 100 can perform object recognition with respect to the object 300. For example, the view can be captured and analyzed by the head-mounted device 100 to determine a characteristic of the object 300. Object recognition can be facilitated by a camera of the head-mounted device 100. Additionally or alternatively, object recognition can be facilitated by one or more other sensors of the head-mounted device 100. For example, the head-mounted device 100 can be in communication with an object 300 where such object 300 includes communication circuitry to communicate information to the head-mounted device 100. By further example, an eye-tracking sensor of the head-mounted device 100 can be used to determine which of multiple objects within a field of view of the head-mounted device 100 corresponds to an object that is the focus of the user's gaze. By further example, an emotion tracking sensor can record an emotion corresponding to a user's gaze and/or speech relating to the object 300.

It will be understood that a wide variety of objects 300 can be recognized, including items, devices, people, buildings, geographic features, locations, and the like. A characteristic of the object 300 can include an identity, name, type, reference, color, size, shape, make, model, or other feature detectable by the head-mounted device 100.

Additionally or alternatively, the object 300 can be a virtual object within a virtual environment. One or more characteristics of the object 300 can be known by the head-mounted device 100 and applied when the object 300 is displayed within the virtual environment. Such virtual objects can be displayed as part of a program, at the user's instruction, and/or as automated feedback prompted by a user's activities.

Once determined, the characteristic can be used as a basis of comparison to the speech 350 of the user 10. For example, the speech 350 can be analyzed to determine whether or not the words spoken by the user 10 correspond to a characteristic of the object 300. Such analysis can include detection of a delay in the user's speech that indicates that the user is unable to speak and/or remember the name or other characteristic of the object 300.

It will be understood that the speech 350 can be determined to correspond or not correspond with a given object 300 based on one or more criteria. For example, the head-mounted device 100 may have or access lookup tables or another database correlating speech and objects to establish proper correspondences. Additionally or alternatively, such correspondences can be based on predetermined, manually selected, automatically selected, and/or other criteria (e.g., machine learning). In some examples, the head-mounted device 100 or another device can be operated in a calibration stage, in which correspondences are established based on recognized objects and speech of the user or another individual. In later stages, the head-mounted device 100 can be operated to determine whether speech by the user fails to correctly refer to objects. While the head-mounted device 100 can provide outputs based on a determined correspondence or lack of correspondence, the user or another individual can manually override such outputs, which override can be stored as a basis for future correspondence determinations.

Responses performed by the head-mounted device can include tracking multiple expressions over time and/or reporting the user's expressions. For example, upon detection of a user's expression, the head-mounted device 100 can record the detection along with any corresponding details, such as features of the speech 350 and/or the object 300. The head-mounted device 100 can store, analyze, and/or communicate data corresponding to such detections.

Additionally or alternatively, responses performed by the head-mounted device can include providing outputs to the user. For example, the head-mounted device 100 can output an indicator that corrects the user's speech. The indicator can include a visual, auditory, haptic feedback, and/or other output that identifies the error in the user's speech and/or the expected speech that would not have incurred an error. By further example, the head-mounted device 100 can output an indicator that corresponds to the object 300. The indicator can include a visual, auditory, haptic feedback, and/or other output that identifies the characteristics of the object 300 for the user. Such indicators can include any information relating to the characteristic, such as labels, textual indications, graphical features, and/or other information. Additionally or alternatively, an indicator can include a virtual object displayed on the display of the head-mounted device as a substitute for the object 300 within the view provided by the display.

Additionally or alternatively, responses performed by the head-mounted device can include communicating with other devices. For example, the head-mounted device 100 can report data corresponding to a user's expressions to another device for storage, analysis, access by the user, etc. By further example, upon detection of one or more expressions (e.g., above a threshold and/or within a threshold duration of time), the head-mounted device 100 can communicate with another device that is accessible by another person. Such communication can include initiating a phone call and/or other communication mechanism so that the user of the head-mounted device 100 can speak to another person (e.g., family member and/or a predetermined contact).

Additionally or alternatively, detections, activity, and other data can be transmitted from the head-mounted device to another device for further operation. Such devices can be operated by the user to reinforce or further perform detections and responses to a user's expressions. For example, a personal electronic device (e.g., smartphone, tablet computer, personal computer, laptop computer, smartwatch, and the like) can be operably connected to the head-mounted device. The personal electronic device can provide similar capabilities as those described herein with respect to the head-mounted device to continue detecting and responding to a user's expressions even when the user is no longer wearing or operating the head-mounted device.

As shown in FIG. 4, a method 400 is provided for detecting and responding to a user's expressions. It will be understood that the method 400 illustrated in FIG. 4 is merely an example, and that a method can be performed with additional steps and/or fewer steps than those illustrated in FIG. 4.

In operation 402, a view of an object is captured by the head-mounted device (e.g., by a camera or other sensor of the head-mounted device). The view can be optionally displayed to the user. In operation 404, speech from the user is recorded by the head-mounted device (e.g., by a microphone of the head-mounted device). In operation 406, the object and/or a characteristic of the object is identified based on the captured view. In operation 408, a word spoken by the user (e.g., based on the recorded speech) is identified. In operation 410, the head-mounted device can determine whether the word is associated with the object and/or the characteristic of the object. In operation 412, the head-mounted device can output to the user an indicator associated with the object and/or the speech, as discussed herein.

Figure 5:
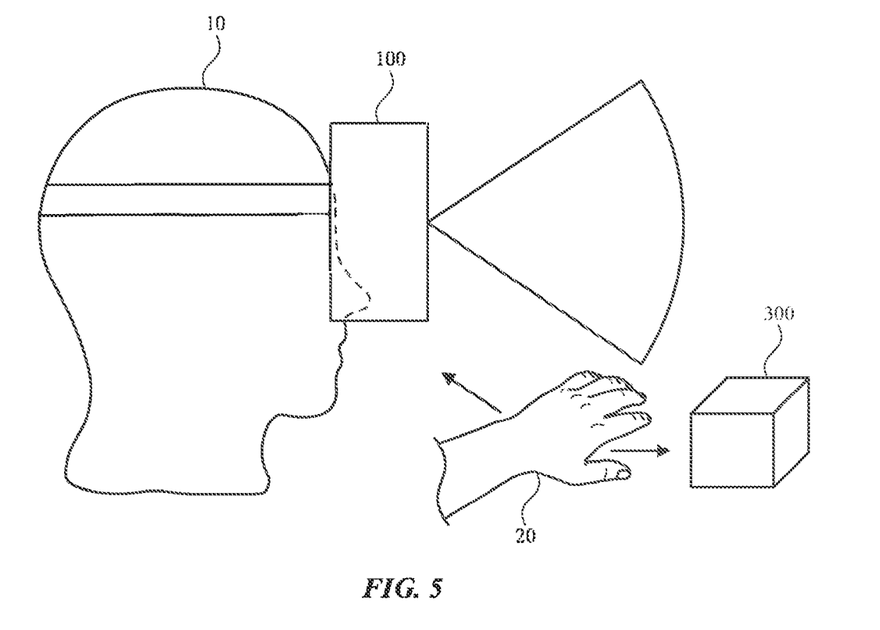
FIG. 5 illustrates a schematic view of a head-mounted device for tracking user actions providing feedback, according to some embodiments of the present disclosure.
Figure 6:
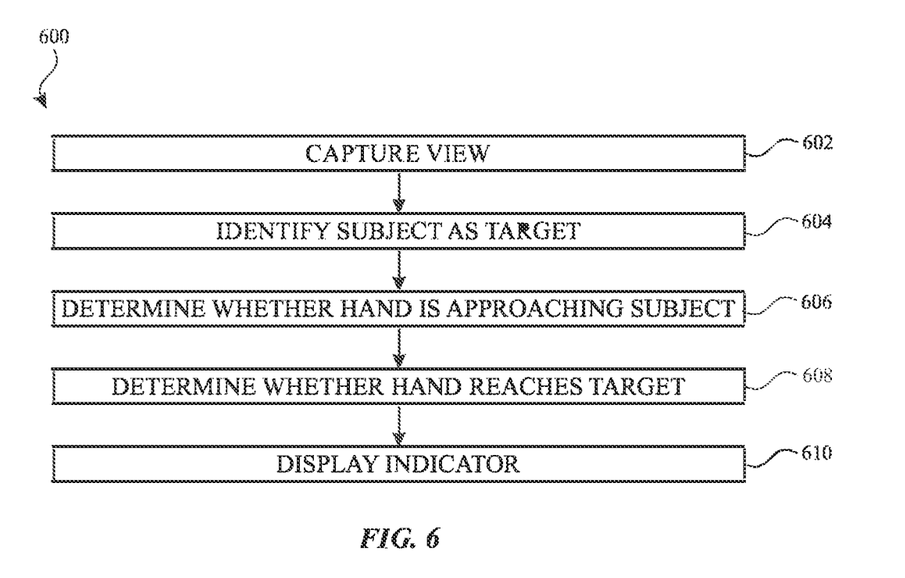
FIG. 6 illustrates a method of operating a head-mounted device, in accordance with some embodiments of the present disclosure.

Referring now to FIGS. 5 and 6, a head-mounted device can detect and/or respond to a user's expressions, including an impaired ability to carry out motor activities despite intact motor function. In particular, the head-mounted device can be configured to detect failures to complete motor function tasks. Appropriate responses can be provided by the head-mounted device upon detection of an expression.

As shown in FIG. 5, a head-mounted device 100 can be configured to detect motion of a limb 20 (e.g., hand, finger, leg, foot, etc.) of the user 10 wearing the head-mounted device 100. Such detections can be based on operation of a camera and/or another sensor of the head-mounted device 100. For example, the head-mounted device 100 can be configured to capture a view of the limb 20 and/or an item held by or otherwise in contact with the limb. Such items can include a tool, an instrument, a utensil, cutlery, a glove, a ring, a bracelet, and the like. The head-mounted device 100 can perform object recognition with respect to any item held at the limb 20. Additionally or alternatively, the head-mounted device 100 can be in communication with an item held at the limb 20 where such an item includes communication circuitry to communicate information to the head-mounted device 100. The item can communicate information corresponding to its identity, location, orientation, motion, and how the user is interacting with the item (e.g., grip strength, forces applied, etc.).

The head-mounted device 100 can be configured to detect an object 300. An object 300 can include any object with which the user 10 can interact. For example, an object 300 can include a device, a possession, an input member (e.g., button, dial, etc.), a person, and the like. The object 300 can be recognized as described further herein. Additionally or alternatively, the object 300 can be a virtual object within a virtual environment. The user can interact with the object within the virtual environment using one of a variety of input mechanisms. For example, user gestures can be interpreted for interaction with the object.

The head-mounted device 100 can be configured to determine whether an object 300 is a target of the user's actions. Object recognition can be facilitated by a camera of the head-mounted device 100. For example, the view can be captured and analyzed by the head-mounted device 100 to identify the object 300 as a target for the user's actions. Additionally or alternatively, object recognition can be facilitated by one or more other sensors of the head-mounted device 100. For example, the head-mounted device 100 can be in communication with an object 300 where such the object 300 includes communication circuitry to communicate information to the head-mounted device 100. By further example, an eye-tracking sensor can be used to determine which of multiple objects within a field of view of the head-mounted device 100 corresponds to an object that is the focus of the user's gaze. The head-mounted device 100 can consider eye focus direction, pupil dilation size, pupil dilation duration, pupil dilation latency, and/or other features of the eye to determine whether the user is focusing gaze upon a given object. Based on the determined gaze, an object 300 can be determined to be a target of the user's attention and/or the intended target of the user's motor activities. By further example, an emotion tracking sensor can record an emotion corresponding to a user's gaze and/or gestures with respect to the object 300.

The head-mounted device can be configured to track gestures corresponding to the user's actions. Gesture tracking can be facilitated by a camera of the head-mounted device 100, another sensor of the head-mounted device 100, and/or another sensor external to the head-mounted device 100 (e.g., in an item held by the limb 20 or in the external environment). For example, data can be captured, processed, and are generated by one or more of the head-mounted devices where the data includes captured views of a user's limbs 20. Gesture recognition can involve the detection of a position, orientation, and/or motion of a user (e.g., limbs 20, hands, fingers, etc.). Such tracking can be performed to determine gestures with respect to the object 300 serving as the target. For example, the head-mounted device 100 can track when the limbs 20 and/or an item held by the limbs approaches, contacts, moves, attaches to, and/or moves away from the object 300. The head-mounted device 100 can track when the limbs 20 and/or an item held by the limbs fails to achieve one or more of such actions. Additionally or alternatively, gesture tracking can be used to determine which of multiple objects is the object 300 that the user intends to act upon as a target. For example, the head-mounted device 100 can determine an object 300 to be a target when a limb 20 moves toward the object 300, and the head-mounted device 100 can further determine whether the limb 20 successfully arrives at and/or contacts the object 300. The head-mounted device 100 can further determine when a user drops an item that is, at one point, held at a limb 20 of the user.

Additionally or alternatively, tracking of a limb can be facilitated by one or more devices external to the head-mounted device 100. For example, an external device can be worn or held by a user at the limb. By further example, such an external device can include a smart watch, a fitness tracker, a wrist-worn device, a ring, an armband, a leg band, and/or another device can be worn or held by the user. The external device can sense one or more characteristics of the user, such as limb movement. The external device can include an accelerometer, gyroscope, compass, magnetic tracker, or another sensor. Additionally or alternatively, the external device can include one or more markers identifiable by the head-mounted device 100 and/or another device. The head-mounted device 100 can be operably connected to such an external device. The external device can transmit sensor data to the head-mounted device, the sensor data relating to the position, movement, and/or orientation of the external device. The head-mounted device can use such data to determine activity of the limb.

It will be understood that the target of a user's actions can be a portion of the user. For example, the head-mounted device 100 can detect an attempt to bring a limb 20 and/or an object 300 (e.g., food) to the user (e.g., the user's mouth to consume the food). The head-mounted device 100 can track motion of the limb 20 and/or the object 300 and determine whether either arrives at the user's face or other target.

Such analysis can include a margin (e.g., distance) by which the target was missed, a delay reaching the target, and/or any other aspect of a user's successful or failed attempt to reach the target.

In response to a detected expression, the head-mounted device can perform one or more actions. Responses performed by the head-mounted device can include tracking multiple expressions over time and/or reporting the user's expressions. For example, upon detection of a user's expression, the head-mounted device 100 can record the detection along with any corresponding details, such as a margin (e.g., distance) by which the target was missed and/or a delay reaching the target. The head-mounted device 100 can store, analyze, and/or communicate data corresponding to such detections.

Additionally or alternatively, responses performed by the head-mounted device can include providing outputs to the user. For example, the head-mounted device 100 can output an indicator that corrects the user's attempt to reach a target. The indicator can include a visual, auditory, haptic feedback, and/or other output that identifies the target and/or the actual result of an attempt. By further example, the head-mounted device 100 can output an indicator that corresponds to the object 300. The indicator can include a visual, auditory, haptic feedback, and/or other output that identifies the target or otherwise guides the user in a subsequent attempt. Additionally or alternatively, an indicator can include a virtual object displayed on the display of the head-mounted device as a substitute for the object 300 within the view provided by the display.

Additionally or alternatively, responses performed by the head-mounted device can include communicating with other devices. For example, the head-mounted device 100 can report data corresponding to a user's expressions to another device for storage, analysis, access by the user, etc. By further example, upon detection of one or more expressions (e.g., above a threshold and/or within a threshold duration of time), the head-mounted device 100 can communicate with another device that is accessible by another person. Such communication can include initiating a phone call and/or other communication mechanism so that the user of the head-mounted device 100 can speak to another person (e.g., family member and/or a predetermined contact).

Additionally or alternatively, detections, activity, and other data can be transmitted from the head-mounted device to another device for further operation. Such devices can be operated by the user to reinforce or further perform detections and responses to a user's expressions. For example, a personal electronic device (e.g., smartphone, tablet computer, personal computer, laptop computer, smartwatch, and the like) can be operably connected to the head-mounted device. The personal electronic device can provide similar capabilities as those described herein with respect to the head-mounted device to continue detecting and responding to a user's expressions even when the user is no longer wearing or operating the head-mounted device.

As shown in FIG. 6, a method 600 is provided for detecting and responding to a user's expressions. It will be understood that the method 400 illustrated in FIG. 6 is merely an example, and that a method can be performed with additional steps and/or fewer steps than those illustrated in FIG. 6.

In operation 602, a view of a limb and/or an object is captured by the head-mounted device (e.g., by a camera or other sensor of the head-mounted device). The view can be optionally displayed to the user. A user's gaze can optionally be determined based on an eye-tracking sensor of the head-mounted device. In operation 604, the head-mounted device can identify the object as a target based on the view of the object and/or a direction of a user's gaze. In operation 606, the head-mounted device can determine whether the limb is approaching the object based on the view captured by the camera. In operation 608, the head-mounted device can determine whether the hand reaches the target based on the view captured by the camera. In operation 610, the head-mounted device outputs to the user an indicator, as discussed herein.

Figure 7:
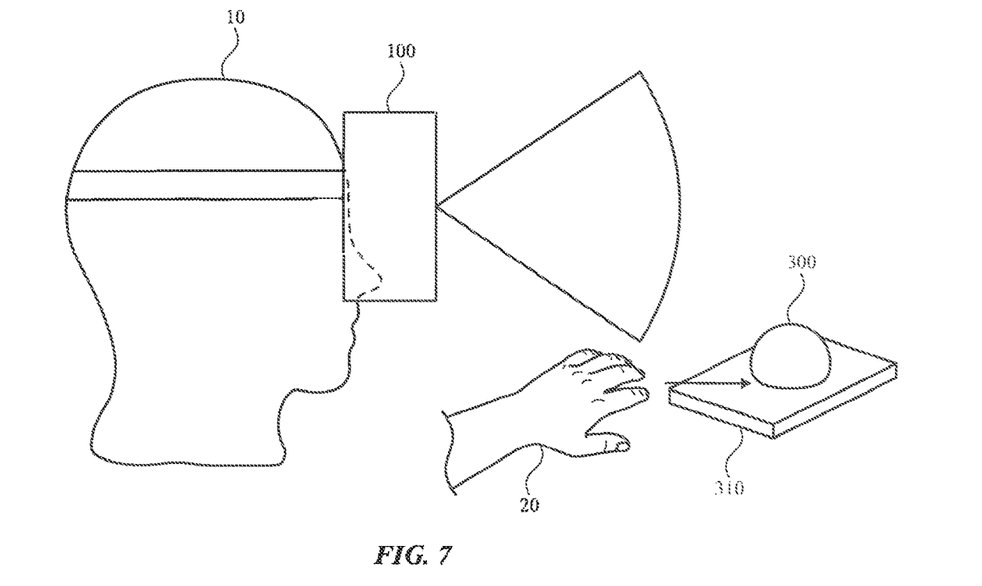
FIG. 7 illustrates a schematic view of a head-mounted device for tracking user actions and detecting nearby objects, according to some embodiments of the present disclosure.
Figure 8:
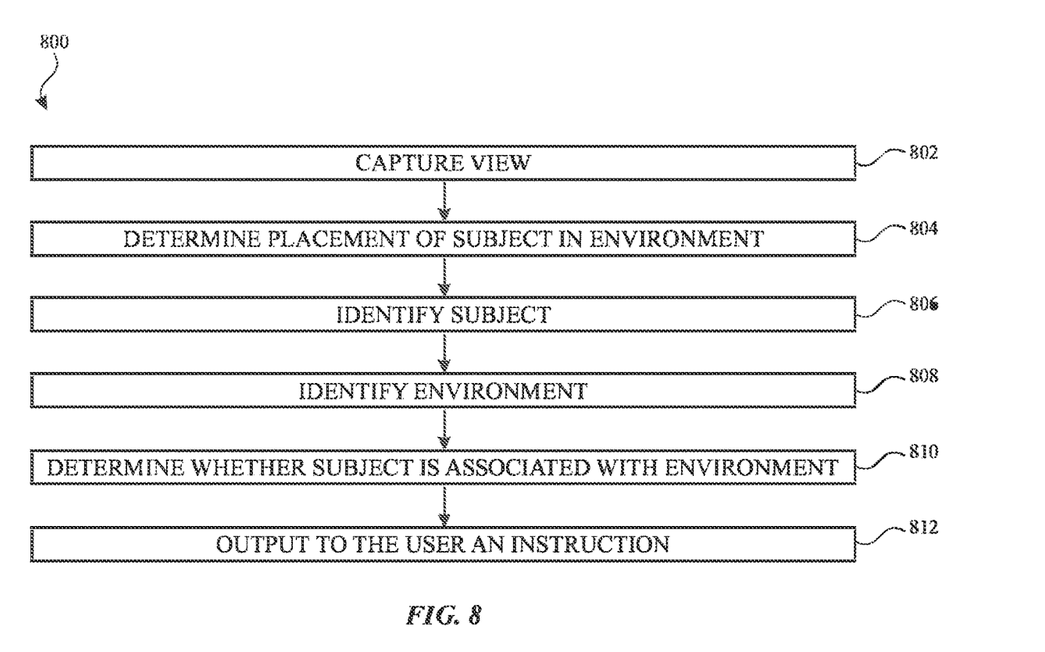
FIG. 8 illustrates a method of operating a head-mounted device, in accordance with some embodiments of the present disclosure.

Referring now to FIGS. 7 and 8, a head-mounted device can detect and/or respond to a user's expressions, including an impaired ability to carry out motor activities despite intact motor function. In particular, the head-mounted device can be configured to detect a user's inability to recognize objects and/or the purpose of objects. Appropriate responses can be provided by the head-mounted device upon detection of an expression.

As shown in FIG. 7, a head-mounted device 100 can be configured to detect motion of a limb 20 (e.g., hand, finger, leg, foot, etc.) of the user 10 wearing the head-mounted device 100, an object 300, and/or an environment 310. Such detections can be based on operation of a camera and/or another sensor of the head-mounted device 100. The head-mounted device 100 can perform object recognition with respect to any of the foregoing. Additionally or alternatively, the head-mounted device 100 can be in communication with one or more of the foregoing where such items include communication circuitry to communicate information to the head-mounted device 100. For example, an item (e.g., an object 300 and/or an environment 310) can communicate information corresponding to its identity, location, orientation, motion, and how the user is interacting with the item. Additionally or alternatively, the object 300 can be a virtual object and/or the environment 310 can be a virtual environment. The user can interact with the object within the virtual environment using one of a variety of input mechanisms. For example, user gestures can be interpreted for interaction with the object.

The head-mounted device 100 can be configured to detect the object 300 and track a user's interactions with the object 300. An object 300 can include any object with which the user 10 can interact. For example, an object 300 can include a device, a possession, an input member (e.g., button, dial, etc.), a tool, an instrument, a utensil, cutlery, and the like. The object 300 can be recognized as described further herein. It will be recognized that the environment 310 can have or include items, devices, people, buildings, geographic features, locations, and the like.

The head-mounted device 100 can be configured to determine whether the object 300 is properly associated with an environment 310 into which the user 10 places or operated the object 300. For example, the view can be captured and analyzed by the head-mounted device 100 to identify the object 300 as well as the environment 310. If the user places the object 300 or uses the object 300 in an environment 310 in which the object 300 does not belong, the head-mounted device 100 can perform corresponding actions. Such actions can include an output to the user of an indicator that includes a suggestion of how to correct the action.

It will be understood that an object 300 can be determined to be associated or not associated with a given environment 310 based on one or more criteria. For example, the head-mounted device 100 may have or access lookup tables or another database correlating objects and environments to establish proper associations. Additionally or alternatively, such associations can be based on predetermined, manually selected, automatically selected, and/or other criteria (e.g., machine learning). In some examples, the head-mounted device 100 or another device can be operated in a calibration stage, in which associations are established based on conditions (e.g., proximity of objects to environments) during the calibration stage. In later stages, the head-mounted device 100 can be operated to determine whether alterations made after the calibration stage violate one or more associations previously established. While the head-mounted device 100 can provide outputs based on a determined association or lack of association, the user or another individual can manually override such outputs, which override can be stored as a basis for future association determinations.

The head-mounted device 100 can provide guidance to a user that is taking particular actions even before completing such actions. The head-mounted device 100 can detect an object 300 that was, is, or will be acted upon by the user 10 (e.g., with the limb 20).

The head-mounted device 100 can provide guidance based on an anticipated error. For example, an eye-tracking sensor can be used to determine a user's gaze as an indication of where a user is considering placing and/or using the object 300. For example, the user may be looking for a place to place and/or use the object 300, and the direction of the user's gaze may indicate to the head-mounted device 100 that the user is considering such action. The head-mounted device 100 can consider eye focus direction, pupil dilation size, pupil dilation duration, pupil dilation latency, and/or other features of the eye to determine whether the user is focusing gaze upon a given environment 310. Based on the determined gaze, an environment 310 can be determined to be a target of the user's attention and/or the intended target corresponding to the placement and/or use of the object 300. By further example, an emotion tracking sensor can record an emotion corresponding to a user's gaze and/or gestures with respect to the object 300 and/or the environment 310.

Additionally or alternatively, the head-mounted device can be configured to track gestures corresponding to the user's actions. Gesture tracking can be facilitated by a camera of the head-mounted device 100, another sensor of the head-mounted device 100, and/or another sensor external to the head-mounted device 100 (e.g., in an item held by the limb 20 or in the external environment). For example, data can be captured, processed, and are generated by one or more of the head-mounted devices where the data includes captured views of a user's limbs 20. Gesture recognition can involve the detection of a position, orientation, and/or motion of a user (e.g., limbs 20, hands, fingers, legs, feet, etc.). Such tracking can be performed to determine gestures with respect to the object 300 and/or the environment 310.

For example, the head-mounted device 100 can track when the limbs 20 and/or an item held by the limbs approaches, contacts, and/or moves the object 300 with respect to the environment 310.

The head-mounted device 100 can output to the user 10 an indicator that includes a suggestion of where to place the object 300 and/or how to use the object 300. Such an indicator can include visual, auditory, and/or other output that guides the user. For example, the indicator can include labels, textual indications, graphical features, and/or other information on a display of the head-mounted device 100. The indicator can be provided with respect to the object 300 and/or the environment 310.

Such analysis can include information about the object 300, the environment 310, and/or the correct match of object and environment.

In response to a detected expression, the head-mounted device can perform one or more actions. Responses performed by the head-mounted device can include tracking multiple expressions over time and/or reporting the user's expressions. For example, upon detection of a user's expression, the head-mounted device 100 can record the detection along with any corresponding details, such as information about the object 300, the environment 310, and/or the correct match of object and environment. The head-mounted device 100 can store, analyze, and/or communicate data corresponding to such detections.

Additionally or alternatively, responses performed by the head-mounted device can include providing outputs to the user. For example, the head-mounted device 100 can output an indicator that corrects the user's placement and/or use of an object. The indicator can include a visual, auditory, haptic feedback, and/or other output that identifies the target and/or the actual result of an attempt. By further example, the head-mounted device 100 can output an indicator that corresponds to the object 300. The indicator can include a visual, auditory, haptic feedback, and/or other output that identifies the target or otherwise guides the user in a subsequent attempt, as discussed herein. Additionally or alternatively, an indicator can include a virtual object displayed on the display of the head-mounted device as a substitute for the object 300 and/or the environment within the view provided by the display.

Additionally or alternatively, responses performed by the head-mounted device can include communicating with other devices. For example, the head-mounted device 100 can report data corresponding to a user's expressions to another device for storage, analysis, access by the user, etc. By further example, upon detection of one or more expressions (e.g., above a threshold and/or within a threshold duration of time), the head-mounted device 100 can communicate with another device that is accessible by another person. Such communication can include initiating a phone call and/or other communication mechanism so that the user of the head-mounted device 100 can speak to another person (e.g., family member and/or a predetermined contact).

Additionally or alternatively, detections, activity, and other data can be transmitted from the head-mounted device to another device for further operation. Such devices can be operated by the user to reinforce or further perform detections and responses to a user's expressions. For example, a personal electronic device (e.g., smartphone, tablet computer, personal computer, laptop computer, smartwatch, and the like) can be operably connected to the head-mounted device. The personal electronic device can provide similar capabilities as those described herein with respect to the head-mounted device to continue detecting and responding to a user's expressions even when the user is no longer wearing or operating the head-mounted device.

As shown in FIG. 8, a method 800 is provided for detecting and responding to a user's expressions. It will be understood that the method 800 illustrated in FIG. 8 is merely an example, and that a method can be performed with additional steps and/or fewer steps than those illustrated in FIG. 8.

In operation 802, a view of a limb, an object, and/or an environment is captured by the head-mounted device (e.g., by a camera or other sensor of the head-mounted device). The view can be optionally displayed to the user. A user's gaze can optionally be determined based on an eye-tracking sensor of the head-mounted device. In operation 804, the head-mounted device determines when the user places the object in the environment. In operation 806, the head-mounted device identifies the object (e.g., based on a view captured by the camera or other sensor). In operation 808, the head-mounted device identifies the environment (e.g., based on the view captured by the camera or other sensor). In operation 810, the head-mounted device determines whether the object is associated with the environment. In operation 812, the head-mounted device outputs to the user an indicator (e.g., instruction) based on the object and the environment.

It will be recognized that the mechanisms and methods described herein can be used to track a user's actions across a period of time.

In at least some embodiments, head-mounted devices described herein can be operated to provide indicators to the user based on sensed conditions and/or objects. For example, a head-mounted device can detect an object and provide an indicator to the user alerting the user to the presence and/or another characteristic of the object. By further example, a head-mounted device can provide assistance for observation of an object by the user. Such assistance can include magnification (e.g., zoom), contrast adjustment, highlighting, labelling, lensing effects, brightness adjustment, adjustment to correct blind spot effects, and the like. by further example, a head-mounted device can provide auditory outputs for receipt by a user. Such outputs can include amplification of sounds, adjustment of volume outputs, text-to-speech, and the like.

In at least some embodiments, head-mounted devices described herein can operate as a virtual assistant to provide guidance and/or feedback to a user. For example, a head-mounted device can be programmed with a routine and/or schedule of activities. The schedule and/or routing can be based on predetermined, manually selected, automatically selected, and/or other criteria (e.g., machine learning). According to the schedule and/or routing, at an appropriate time for a given activity, the head-mounted device can provide an output that reminds the user of the corresponding activity. The head-mounted device can identify objects and/or the environment to determine whether the user is properly conducting the corresponding activity. The head-mounted device can provide reminders, instructions, pathfinding suggestions, and/or other guidance to assist the user in properly conducting the activity. For example, the head-mounted device can identify an object with which the user should interact. By further example, the head-mounted device can indicate a direction and/or path that the user should follow to arrive at a target location. Such outputs can assist a user in returning to an object and/or location despite the effects of becoming confused, lost, and/or disoriented. The head-mounted device can further detect when a user is deviating from a schedule and/or routine and provide outputs as discussed further herein. For example, upon deviating from a schedule and/or routine, the head-mounted device can initiate a phone call and/or other communication mechanism so that the user of the head-mounted device can speak to another person (e.g., family member and/or a predetermined contact).

In at least some embodiments, head-mounted devices described herein can operate to provide reminders to improve memory of a user. For example, a head-mounted device can provide periodic outputs (e.g., photos, stories, voice recordings) from the user's prior experiences. By further example, the head-mounted device can periodically remind the user of important people enter places to refresh the user's memory and recollection thereof. By further example, the head-mounted device can provide an output that reminds the user of what activities the user engaged in previously (e.g., in the previous day and/or other time period). Such outputs can be provided upon user request and/or automatically based on certain detections (e.g., upon detection that a user is speaking to someone about the activities engaged in and/or that the user is struggling to remember based on gaps in speech).

While some embodiments of the present disclosure illustrate a head-mounted device detecting activities of a user wearing the head-mounted device, it will be understood that such detections can also be performed by a head-mounted device that is not worn by the user and/or by any other external device. For example, a head-mounted device worn by one individual can detect activities of another individual. Additionally or alternatively, multiple head-mounted devices can operate in concert to leverage their combined sensory input, as well as those of other external devices to improve detections. For example, sharing sensory input between multiple head-mounted devices can complement and enhance individual units by providing perceptive data from multiple angles and positions, which also reduces occlusions and inaccuracies. As more detailed information is available at a specific moment in time, the speed and accuracy of detections can be improved. Such detections can be performed in accordance with a privacy policy. For example, the monitored user can provide permission for such detections and corresponding analyses to be performed, as discussed further herein.

Additionally or alternatively, a device other than a head-mounted device can detect activities of an individual. Such an external device can be any device configured to perform detections, analyze data, and/or communicate with one or more head-mounted devices. The external device can operate in a manner that is similar to any one of the head-mounted devices described herein, even without being worn by a user. The external device can include one or more sensors for detecting activities of a user (e.g., camera, microphone, accelerometer, gyroscope, virtual interaction mechanisms, etc.). Data can be shared between or among head-mounted devices and/or external devices. The external device can be a computing device, a phone, a smartphone, a wearable electronic device, a portable electronic device, a server, a cloud-based device, or a combination thereof.

Various examples of aspects of the disclosure are described below as clauses for convenience. These are provided as examples, and do not limit the object technology.

Clause A: a head-mounted device comprising: a display for providing a view of an object to a user wearing the head-mounted device; a microphone configured to record speech of the user; a camera configured to capture a view of the object; and a processor configured to: identify the object based on the view captured by the camera; identify a word spoken by the user based on the speech recorded by the microphone; and determine whether the word is associated with the object.

Clause B: a head-mounted device comprising: a display for providing a view of an object to a user wearing the head-mounted device; a camera configured to capture a view of the object and a limb of the user; an eye-tracking device configured to determine a direction of a gaze of the user; and a processor configured to: identify the object as a target based on the view of the object and the direction of the gaze; determine whether the limb is approaching the object based on the view captured by the camera; and determine whether the limb reaches the target based on the view captured by the camera.

Clause C: a head-mounted device comprising: a display for providing a view of an object and an environment to a user wearing the head-mounted device; a camera configured to capture a view of the object and the environment; a processor configured to: determine when the user places the object in the environment; identify the object based on the view captured by the camera; identify the environment based on the view captured by the camera; and determine whether the object is associated with the environment.

One or more of the above clauses can include one or more of the features described below. It is noted that any of the following clauses may be combined in any combination with each other, and placed into a respective independent clause, e.g., clause A, B, or C.

Clause 1: the processor is further configured to output to the user an indicator associated with the object.

Clause 2: the indicator that corrects the user's speech with a word that is associated with the object.

Clause 3: the indicator comprises a visual feature provided on the view of the display, the visual feature being based on an identification of the object.

Clause 4: a speaker, wherein the indicator comprises an auditory feature output by the speaker, the auditory feature being based on an identification of the object.

Clause 5: the processor is further configured to: identify when the speech contains a duration of time without any words; and when the duration of time exceeds a threshold, output to the user the indicator associated with the object.

Clause 6: the processor is further configured to: identify when the speech contains a repeated word; and output to the user an indicator based on an identification of the repeated word.

Clause 7: an eye-tracking device configured to determine a direction of a gaze of the user, wherein the processor is further configured to determine whether the object is along the direction of the gaze of the user.

Clause 8: the processor is further configured to report to another device, when the word is not associated with the object, a determination that the word is not associated with the object.

Clause 9: the processor is further configured to display to the user an indicator based on the target, the indicator comprising a visual feature provided on the view of the display, the visual feature being based on an identification of the object.

Clause 10: identifying the object as the target comprises determining whether the object is along a direction of the gaze of the user.

Clause 11: identifying the object as the target is based on an eye focus direction, a pupil dilation size, a pupil dilation duration, or a pupil dilation latency.

Clause 12: the processor is further configured to: determine whether the limb is approaching the object based on the view captured by the camera; and display to the user an indicator based movement of the limb and the target.

Clause 13: the processor is further configured to determine whether the limb reaches a face of the user.

Clause 14: the processor is further configured to report to another device, when the limb does not reach the target, a determination that the limb did not reach the target.

Clause 15: the processor is further configured to output to the user an instruction based on the object and the environment, the instruction correcting the user's placement of the object in the environment by indicating an environment that is associated with the object.

Clause 16: the processor is further configured to output to the user an instruction based on the object and the environment, the instruction comprising a visual feature provided on the view of the display, the visual feature being based on an identification of the object.

Clause 17: the processor is further configured to: detect a user's movement of the object toward the environment; and output to the user an instruction based on the object and the environment.

Clause 18: the processor is further configured to report to another device, when the user places the object in the environment, a determination that the object is not associated with the environment.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mounted device comprising:
a camera configured to capture a view of an object;
a display for providing the view of the object;
a microphone configured to record speech; and
a processor configured to:
identify the object based on the view;
identify when the speech contains a duration of time without any words; and
when the duration of time exceeds a threshold, output an indicator comprising a word that is associated with an identity of the object.

2. The head-mounted device of claim 1, wherein the processor is further configured to:
identify a spoken word based on the speech;
determine whether the spoken word is associated with the identity of the object; and
if the spoken word is not associated with the identity of the object, output the indicator.

3. The head-mounted device of claim 1, wherein the indicator comprises a visual feature provided on the view of the display, the visual feature being based on the identity of the object.

4. The head-mounted device of claim 1, further comprising a speaker, wherein the indicator comprises an auditory feature that is output by the speaker, the auditory feature being based on the identity of the object.

5. The head-mounted device of claim 1, wherein the processor is further configured to:
identify when the speech contains a repeated word; and
output another indicator based on an identification of the repeated word.

6. The head-mounted device of claim 1, wherein the processor is further configured to report to another device, if a spoken word from the speech is not associated with the object, a determination that the spoken word is not associated with the object.

7. A head-mounted device comprising:
a camera configured to capture a view of an object;
a display for providing the view of the object;
a microphone; and
a processor configured to, in a calibration stage:
record first speech with the microphone; and
based on the first speech, establish a correspondence between the first speech and the object,
the processor being further configured to, in a later stage:
record second speech with the microphone;
determine whether, based on the correspondence, the second speech refers to the object; and
if the second speech does not refer to the object, output an indicator associated with the object.

8. The head-mounted device of claim 7, wherein the processor is further configured to:
while the processor is outputting the indicator, receiving an input comprising a manual override; and
storing the manual override as an additional correspondence.

9. The head-mounted device of claim 7, wherein the correspondence is stored a lookup table correlating the first speech to the object.

10. The head-mounted device of claim 7, wherein the indicator comprises a visual feature provided on the view of the display, the visual feature being based on an identification of the object.

11. The head-mounted device of claim 7, further comprising a speaker, wherein the indicator comprises an auditory feature that is output by the speaker, the auditory feature being based on an identification of the object.

12. The head-mounted device of claim 7, further comprising an eye-tracking device configured to determine a direction of a gaze of an eye, wherein the processor is further configured to determine whether the object is along the direction of the gaze.

13. The head-mounted device of claim 7, wherein the processor is further configured to report to another device, if a spoken word of the speech is not associated with the object, a determination that the spoken word is not associated with the object.

14. A head-mounted device comprising:
a camera configured to capture a view of an object;
a display for providing the view of the object;
a microphone configured to record speech; and
a processor configured to:
identify a characteristic of the object based on the view;
identify a spoken word based on the speech;
determine whether the spoken word is associated with the characteristic of the object; and if the spoken word is not associated with the characteristic of the object, output an indicator comprising another word that is associated with the characteristic of the object.

15. The head-mounted device of claim 14, wherein the characteristic comprises at least one of an identity, a name, a type, a reference, a color, a size, a shape, a make, or a model of the object.

16. The head-mounted device of claim 14, wherein the indicator comprises at least one of a label, a textual indication, or a graphical feature.

17. The head-mounted device of claim 14, wherein the indicator comprises a visual feature provided on the view of the display, the visual feature being based on an identification of the object.

18. The head-mounted device of claim 14, further comprising a speaker, wherein the indicator comprises an auditory feature that is output by the speaker, the auditory feature being based on an identification of the object.

19. The head-mounted device of claim 14, further comprising an eye-tracking device configured to determine a direction of a gaze of an eye, wherein the processor is further configured to determine whether the object is along the direction of the gaze.

20. The head-mounted device of claim 14, wherein the processor is further configured to report to another device, if the spoken word is not associated with the object, a determination that the spoken word is not associated with the object.

* * * * *